(12) United States Patent
Choi et al.

(10) Patent No.: US 9,876,639 B2
(45) Date of Patent: Jan. 23, 2018

(54) METHOD FOR PROCESSING DOUBLE CLICK EVENT FOR SECURING SAFETY IN QUANTUM KEY DISTRIBUTION SYSTEM

(71) Applicant: SK TELECOM CO., LTD., Seoul (KR)

(72) Inventors: Jeongwoon Choi, Yongin-si (KR); Seokbeom Cho, Yongin-si (KR); Chulwoo Park, Seongnam-si (KR)

(73) Assignee: SK TELECOM CO., LTD., Seoul (KR)

(*) Notice: Subject to any disclaimer, the term of this patent is extended or adjusted under 35 U.S.C. 154(b) by 145 days.

(21) Appl. No.: 14/877,480

(22) Filed: Oct. 7, 2015

(65) Prior Publication Data

US 2016/0028542 A1 Jan. 28, 2016

Related U.S. Application Data

(63) Continuation of application No. PCT/KR2014/006862, filed on Jul. 28, 2014.

(30) Foreign Application Priority Data

Oct. 25, 2013 (KR) .................. 10-2013-0128012

(51) Int. Cl.
*G06F 21/00* (2013.01)
*H04L 9/08* (2006.01)
(Continued)

(52) U.S. Cl.
CPC .......... *H04L 9/0858* (2013.01); *H04B 10/85* (2013.01); *H04L 9/0852* (2013.01); *H04L 9/14* (2013.01); *H04L 2209/24* (2013.01)

(58) Field of Classification Search
CPC ..................................................... H04L 9/0858
See application file for complete search history.

(56) References Cited

U.S. PATENT DOCUMENTS

2005/0190922 A1* 9/2005 LaGasse ............... H04L 9/0858
380/278
2005/0259825 A1* 11/2005 Trifonov ............... H04L 9/0858
380/277
(Continued)

FOREIGN PATENT DOCUMENTS

| JP | 2008500774 A | 1/2008 |
| KR | 1020060059853 A | 6/2006 |
| KR | 1020100073042 A | 7/2010 |

OTHER PUBLICATIONS

Tobias Moroder et al., "Dector Decoy Quantum Key Distribution", Apr. 30, 2009, pp. 1-27, New J. Phys. vol. 11.
(Continued)

*Primary Examiner* — Morshed Mehedi
(74) *Attorney, Agent, or Firm* — Hauptman Ham, LLP

(57) ABSTRACT

A method performed by a processor of a receiver of generating a secret key using a quantum communication, the processor execute the method comprising: performing a quantum key distribution (QKD) protocol to generate a sifted key; performing a post-processing protocol based on the sifted key to generate a final key; counting the number of double click events when quantum signals are detected; and performing privacy amplification of the final key based on the counted number of the double click events.

4 Claims, 2 Drawing Sheets

(51) Int. Cl.
*H04B 10/85* (2013.01)
*H04L 9/14* (2006.01)

(56) References Cited

U.S. PATENT DOCUMENTS

| | | | | |
|---|---|---|---|---|
| 2006/0059343 | A1* | 3/2006 | Berzanskis | H04L 7/0008 |
| | | | | 713/171 |
| 2006/0256966 | A1* | 11/2006 | Kuang | H04L 9/0858 |
| | | | | 380/256 |
| 2007/0071245 | A1* | 3/2007 | Kuang | H04L 9/0855 |
| | | | | 380/278 |
| 2007/0165862 | A1* | 7/2007 | Young | H04L 9/0852 |
| | | | | 380/278 |
| 2008/0037790 | A1* | 2/2008 | Berzanskis | H04L 9/0852 |
| | | | | 380/278 |
| 2009/0175450 | A1* | 7/2009 | Brandt | H04L 9/0858 |
| | | | | 380/277 |
| 2010/0158252 | A1* | 6/2010 | Youn | H04L 9/0858 |
| | | | | 380/256 |

OTHER PUBLICATIONS

International Search Report dated Oct. 28, 2014 for PCT/KR2014/006862.

* cited by examiner

METHOD FOR PROCESSING DOUBLE CLICK EVENT FOR SECURING SAFETY IN QUANTUM KEY DISTRIBUTION SYSTEM

CROSS-REFERENCE TO RELATED APPLICATIONS

The present application is a continuation of International Patent Application No. PCT/KR2014/006862, filed Jul. 28, 2014, which is based upon and claims the benefit of priority to Korean Patent Application No. 10-2013-0128012, filed on Oct. 25, 2013. The disclosure of the above-listed applications are hereby incorporated by reference herein in their entirety.

TECHNICAL FIELD

The present disclosure in one or more embodiments relates to a quantum key distribution (QKD) method and system.

BACKGROUND

The statements in this section merely provide background information related to the present disclosure and do not necessarily constitute prior art.

In general, a quantum key distribution (QKD) system uses two single photon detectors (SPDs) and each SPD outputs bit 1 (one) in a binary numeral system when a signal is detected (so-called "click"), and outputs bit 0 (zero) in a binary numeral system when no signal is detected. When the two SPDs are denoted by D_0 and D_1, there are four events of bit information output from D_0 and D_1 as follows:

(D_0, D_1)=(0,0)→corresponding to No click event
(D_0, D_1)=(1,0)→corresponding to Normal signal bit 0 event
(D_0, D_1)=(0,1)→corresponding to Normal signal bit 1 event
(D_0, D_1)=(1,1)→corresponding to Double click event The double click event at the end refers to the case where both SPDs detect signals. In this double click event, bit 0 and bit 1 are simultaneously generated despite the same basis being used by both the sender and the receiver so that an error of 50% occurs when either one of the two bits is selected. As such, it is generally preferred to prevent such double click events from being reflected in a protocol.

The inventor(s) has noted that Norbert Lutkenhaus has proposed in non-patent document 1 and non-patent document 2 that double click events generated in a QKD system are not to be removed and are to be separately and safely treated.

An attack is assumed in which an attacker assails a polarizing beam splitter of a receiver with multiple photons under the same basis. As shown in Table 1, when the receiver makes a measurement using a conjugate basis different from that of the attacker's, a double click event occurs in which both of a pair of the receiver SPDs detect signals. When the receiver makes a measurement using the same basis as the attacker's, a normal event is detected.

TABLE 1

| Event | Sender Axis | Attacker Axis | Receiver Axis | Measurement |
|---|---|---|---|---|
| 1 | X | X | X | Normal (no error), Attacker = Receiver |
| 2 | X | X | Z | Double Click |
| 3 | X | Z | X | Double Click |
| 4 | X | Z | Z | Normal (50% error), Attacker = Receiver |
| 5 | Z | X | X | Normal (50% error), Attacker = Receiver |
| 6 | Z | X | Z | Double Click |
| 7 | Z | Z | X | Double Click |
| 8 | Z | Z | Z | Normal (no error), Attacker = Receiver |

When a receiver side determines double click events (events 2, 3, 6 and 7 in Table 1) as abnormal events and discards these events, and uses bits corresponding to the other events (events 1, 4, 5 and 8 in Table 1) as a raw key to implement a QKD protocol, then the receiver finally shares the same information with the attacker. As a result, the attacker can steal the final key without being discovered by a sender or the receiver.

To solve this problem, according to a prior art, double click events are not discarded and bit 0 or bit 1 is arbitrarily allocated whenever a double click event occurs. The sender and the receiver detect an attack of the attacker since the bit value arbitrarily allocated to the double click event generates a bit error with a probability of 50% and consequently increases a quantum bit error rate (QBER).

Here, the inventor(s) has noted that it is required to preclude any regularity in allocating bits 0s or bits 1s to the double click events so that the attacker can be interpreted as capturing from normal events as much information on the key as the ratio of the double click occurrence. However, even further information on the double click events in themselves has to be interpreted as the attacker's capture of information on the key in case the bits 0s or bits 1s are allocated with regularity. In other words, the attacker takes information corresponding to the number of double click events when bit 0 or bit 1 is arbitrarily allocated, and takes information corresponding to twice the number of double click events if bit 0 or bit 1 is allocated with regularity.

As such, according to the prior art, a QKD system is supposed to arbitrarily allocate bit 0 and bit 1 to a double click event, and requires an additional device such as a true random number generator (TRNG) or a true random bit generator (TRBG), and this causes much burden to the QKD system in terms of cost and volume.

Non-patent document 1: "Estimates for practical quantum cryptography", Physical Review A 59, 3301-3319 (1999)

Non-patent document 2: "Security against individual attacks for realistic quantum key distribution", Physical Review A 61: 052304 (2000)

SUMMARY

In accordance with some embodiments of the present disclosure, a method performed by a processor of a receiver of generating a secret key using a quantum communication, the processor execute the method comprising: performing a quantum key distribution (QKD) protocol to generate a sifted key; performing a post-processing protocol based on the sifted key to generate a final key; counting the number of double click events when quantum signals are detected; and performing privacy amplification of the final key based on the counted number of the double click events.

In accordance with other embodiments of the present disclosure, a transmitter comprises a qubit transmitter and a processor. The qubit transmitter is configured to transmit optical pulses via a quantum channel to a receiver, the optical pulses modulated based on a bit sequence and a basis sequence. And the processor is configured to perform a quantum key distribution (QKD) protocol via a public channel to generate a sifted key, perform a post-processing protocol based on the sifted key to generate a final key, and perform a privacy amplification process based on the number of double click events received from the receiver.

In accordance with other embodiments of the present disclosure, a receiver comprises a basis setter, a photon detector and the processor. The basis setter is configured to set a basis sequence used for a qubit demodulation. The photon detector includes a pair of single-photon detectors (SPDs) connected to output ports of the basis setter, wherein the SPDs configured to perform a photon detection and output the result of the photon detection to a processor. And the processor is configured to perform a quantum key distribution (QKD) protocol based on the result of the photon detection to generate a sifted key, perform a post-processing protocol based on the sifted key to generate a final key, count the number of the double click events, and perform privacy amplification of the final key based on the counted number of the double click events.

DETAILED DESCRIPTION

Figure 1:
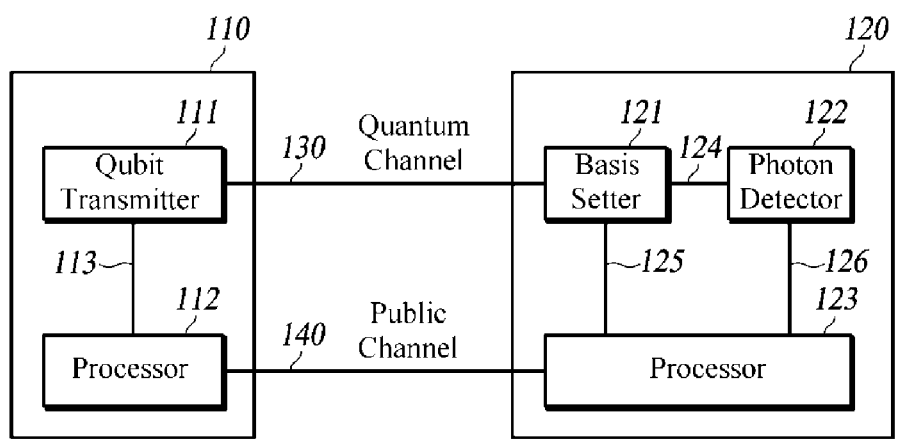
FIG. 1 is a schematic block diagram of a quantum key distribution (QKD) system according to at least one embodiment of the present disclosure.

Hereinafter, at least one embodiment of the present disclosure will be described in detail with reference to the accompanying drawings. Like reference numerals in the drawings denote like elements. In the following description of the present disclosure, a detailed description of known functions and configurations incorporated herein will be omitted when it makes the subject matter of the present disclosure unclear.

It will be understood that the terms "comprises" and/or "comprising," or "includes" and/or "including" when used in this specification, specify the presence of stated components, but do not preclude the presence or addition of one or more other components. The term "unit" or "module" specifies a unit performing at least one function or operation and implementable as hardware, software or a combination thereof.

Some embodiments of the present disclosure provide a method for processing double click events generated in single photon detectors (SPDs) of a quantum key distribution (QKD) system to guarantee security of the QKD system bysimply modifying a protocol without using an additional device such as a true random number generator (TRNG). Some embodiments of the present disclosure provide a method for guaranteeing security of a quantum key distribution (QKD) system simply by counting the number of double click events and allowing the counted number to be shared between a sender and a receiver without using a true random number generator (TRNG). According to at least one embodiment of the present disclosure, the level of security is provided by counting the number of double click events to detect attacks by an attacker and reflecting the number of double click events in the length of a final key without arbitrarily replacing the double click events with bit 0 and bit 1 by using a TRNG.

A description is now given of a QKD system 100 according to at least one embodiment of the present disclosure with reference to FIG. 1.

The QKD system 100 includes a transmitter 110, and a receiver 120 connected via a quantum channel 130 and a public channel 140. The quantum channel 130 is used when the transmitter 110 transmits quantum signals to the receiver 120. The public channel 140 is used for data communication between the transmitter 110 and the receiver 120. The public channel 140 includes, for example, the Internet, optical fibers carrying intense optical pulses, or any other means for data communication. The quantum channel 130 is an optical fiber or free space.

The transmitter 110 includes a qubit transmitter 111 and a processor 112. Each of the qubit transmitter 111 and the processor 112 is implemented by, or includes, one or more processors and/or application-specific integrated circuits (ASICs) specified for respectively corresponding operations and functions described herein in the present disclosure. The qubit transmitter 111 includes a communication module to transmit signals (e.g., a qubit sequence via the quantum channel 130 to the receiver 120).

The qubit transmitter 111 generates a qubit (quantum bit, e.g., quantum information carried by a quantum particle) sequence and transmits the qubit sequence via the quantum channel 130 to the receiver 120. If BB84 protocol is implemented by using, for example, phase modulation proposed by Paul Townsend et al., the qubit transmitter 111 includes a pulse laser source configured to generate an optical pulse sequence, a Mach-Zehnder interferometer used to generate a pair of temporally separated optical pulses by using two paths having different lengths, a phase modulator located on any one of the paths of the interferometer, and a variable optical attenuator configured to reduce an average number of photons per pulse to an appropriate level. The components included in the qubit transmitter 111 vary depending on a protocol, a coding scheme and a possible implementation thereof.

The processor 112 is connected via a transmission line 113 to the qubit transmitter 111. The processor 112 is, for example, an arbitrary computing device including a memory, input/output ports and a processing unit, and it is used to generate and store desired information (e.g., a final secret key) as well as a communication mechanism which enables communication with the receiver 120. Particularly, in a QKD protocol execution process, the processor 112 receives the number of double click events from a processor 123 of the receiver 120 and reflects the number of double click events in a privacy amplification process to adjust the length of a final key. In addition, if the number of double click events exceeds a preset permissible limit, the processor 112 discards the corresponding protocol.

The receiver 120 includes a basis setter 121, a photon detector 122 and the processor 123. Each of the basis setter 121, the photon detector 122 and the processor 123 is implemented by, or includes, one or more processors and/or application-specific integrated circuits (ASICs) specified for respectively corresponding operations and functions described herein. The receiver 120 includes a communication module to transmit and or receive signals to and from the transmitter 110.

The basis setter 121 selects a measurement basis used for qubit demodulation, and includes one input port and two output ports. The input port of the basis setter 121 is connected to the quantum channel 130. A single-photon is output from one of the output ports depending on the basis set by the basis setter 121. The output ports of the basis setter 121 are connected to the photon detector 122.

If BB84 protocol is implemented by using, for example, phase modulation proposed by Paul Townsend et al., the basis setter 121 includes a Mach-Zehnder interferometer corresponding to the interferometer of the transmitter 110, and a phase modulator located on any one of the paths of the interferometer to select a basis for qubit demodulation. The components included in the basis setter 121 vary depending on a protocol, a coding scheme and a possible implementation thereof.

The photon detector 122 includes, for example, a pair of single photon detectors (SPDs) individually connected to the output ports of the basis setter 121 to perform a photon detection, and outputs the result of the photon detection via a transmission line 126 to the processor 123. The SPDs are implemented as avalanche photo diodes (APDs) operating in Geiger mode. The transmission line 126 is used by the photon detector 122 for receiving one or more operation parameters from the processor 123 and also used by the processor 123 in recording the output of the photon detector 122.

The processor 123 is connected via a transmission line 125 to the basis setter 121, and transmits a basis sequence to be set by the basis setter 121. The processor 123 is, for example, an arbitrary computing device including a memory, input/output ports and a processing unit configured to manage operations for generating and storing the desired information (e.g., a final secret key) as well as a communication mechanism which enables communications with the transmitter 110. Particularly, the processor 123 counts the number of double click events based on the output of the photon detector 122, and shares the counted number with the processor 112 of the transmitter 110. Furthermore, the processor 123 reflects the number of double click events in a privacy amplification process to adjust the length of a final key. In addition, if the number of double click events exceeds a preset permissible limit, the processor 123 discards the corresponding protocol.

As described above in relation to FIG. 1, a QKD system according to at least one embodiment of the present disclosure guarantees security thereof by limiting a permissible range of the number of double click events.

Double click events are potentially generated due to attacks of an attacker and/or due to incomplete factors in implementation of the QKD system irrespective of an attack. For example, in the case of an APD used as an SPD, even if there is no incident single-photon, a detection event (i.e., dark count) potentially occurs due to thermal generation of a carrier or a detection event (i.e., after pulse) potentially occurs due to charges trapped by APD junction. Furthermore, such event is also potentially detected due to an optical misalignment error in terms of polarization, phase or the like when a pseudo single-photon light source is used with optical pulses involving a multi-photon.

The following describes the number of double click events generated due to the above-mentioned factors in a QKD system having an operation frequency of 100 MHz and a transmission distance of 50 km (e.g., between the transmitter 110 and the receiver 120).

Assuming that a loss due to distance is 10 dB and with 20 dB more as a system loss due to the efficiency of optical elements and SPDs, the total loss of 30 dB would cause detection events in the order of 100 kbits per second. Consequently, assuming that a dark count probability per gate is $10^{-5}$, about 1 or less double click event occurs per second. When ignoring the loss by distance in consideration of the short distance, detection events occur by about 1 Mbit per second which include not more than 10 occurrences of double click events.

Therefore, the number of double click events Dmax which can be generated due to incomplete factors in system implementation irrespective of attacks of an attacker varies depending on a system implementation environment and it is expressed as given by Equation 1.

$$D_{max} = f_g \times (L_{sys} \cdot L_{ch} \cdot P_{dark} \cdot P_{multi-t} \cdot L_{miss} \cdot P_{multi\_d}) + A \quad \text{Equation 1}$$

Here, $f_g$ denotes a system operation frequency, $L_{sys}$ denotes a system loss, $L_{ch}$ a channel loss, $L_{miss}$ an optical misalignment loss, $P_{dark}$ a dark count probability, $P_{multi-t}$ a multi-photon transmission probability, and $P_{multi-d}$ a multi-photon detection probability. In addition, A is a safety factor and is a value used to compensate for statistical variations by adding a certain rate to an average value of double click events.

According to at least one embodiment of the present disclosure, a permissible limit of the number of double click events is set to $D_{max}$ and a protocol is discarded if the number of double click events exceeds the permissible limit. Considering deteriorations of the components of the QKD system over time, the permissible limit is set to a value greater than the above $D_{max}$ value. In this case, $D_{max}$ is a reference for determining whether the QKD system needs to be readjusted.

The QKD system according to at least one embodiment of the present disclosure provides the level of security by reflecting the number of double click events in the length of a final key.

Double clicks due to system incompleteness are not distinguishable from double clicks due to the attacks of an attacker. Accordingly, in the present disclosure, to guarantee security of the QKD system from a conservative point of view, all double click events are regarded as those of the attacker. As shown in Table 1, when the attacker attacks, double click events occur by about half the number of attacks and the attacker takes information corresponding to the other half of the number of attacks.

According to the prior art, a receiver arbitrarily replaces each double click event with 0 or 1 to forcibly increase a QBER for a sifted key shared with a sender from original $QBER_0$ to $QBER_1$, and correspondingly reduces the length of a final key to guarantee security. The resulting length of the final key in a QKD system is denoted by $Length_{final}$ and calculated as given by Equation 2.

$$Length_{final} = Length_{sifted} \times \{1 - 2 \cdot h(QBER_1)\} \quad \text{Equation 2}$$

Here, $Length_{sifted}$ denotes the length of a sifted key, and QBER denotes a quantum bit error rate. Furthermore, h(x) denotes Shannon entropy and is expressed as $h(x) = -x \log_2 x - (1-x) \log_2(1-x)$.

According to at least one embodiment of the present disclosure, the length of a final key is adjusted by counting the number of double click events and increasing the amount of information taken by an attacker, by the counted number, instead of arbitrarily replacing each double click event with 0 or 1. A method for adjusting the length of the final key varies based on a QKD protocol, the implemented system characteristics, etc. For example, the length of the final key is adjusted as given by Equation 3.

$$\text{Length}_{final} = \text{Length}_{sifted} \times \{1 - 2 \cdot h(\text{QBER})\} - \text{Num}_{double} \quad \text{Equation 3}$$

Here, $\text{Num}_{double}$ denotes the number of double click events.

To adjust the length of the final key, the sender also needs to know the same information as the receiver and thus the receiver needs to signal the number of double click events to the sender.

When a QKD protocol is implemented by using a method for processing double click events according to at least one embodiment of the present disclosure, the process for counting the number of double click events or having a receiver share the counted number with a sender, for example, precedes in the initial part of the QKD protocol for converting quantum signals to a digital domain in advance of the generating of a sifted key by exchanging basis information. In addition, a process for reflecting the number of double click events in the length of a final key by the sender and the receiver is included in a privacy amplification process. The QKD system 100 further comprises input units (not shown in FIG. 1) such as one or more buttons, a touch screen, a mic and so on, and output units (not shown in FIG. 1) such as a display, an indicator and so on.

Figure 2:
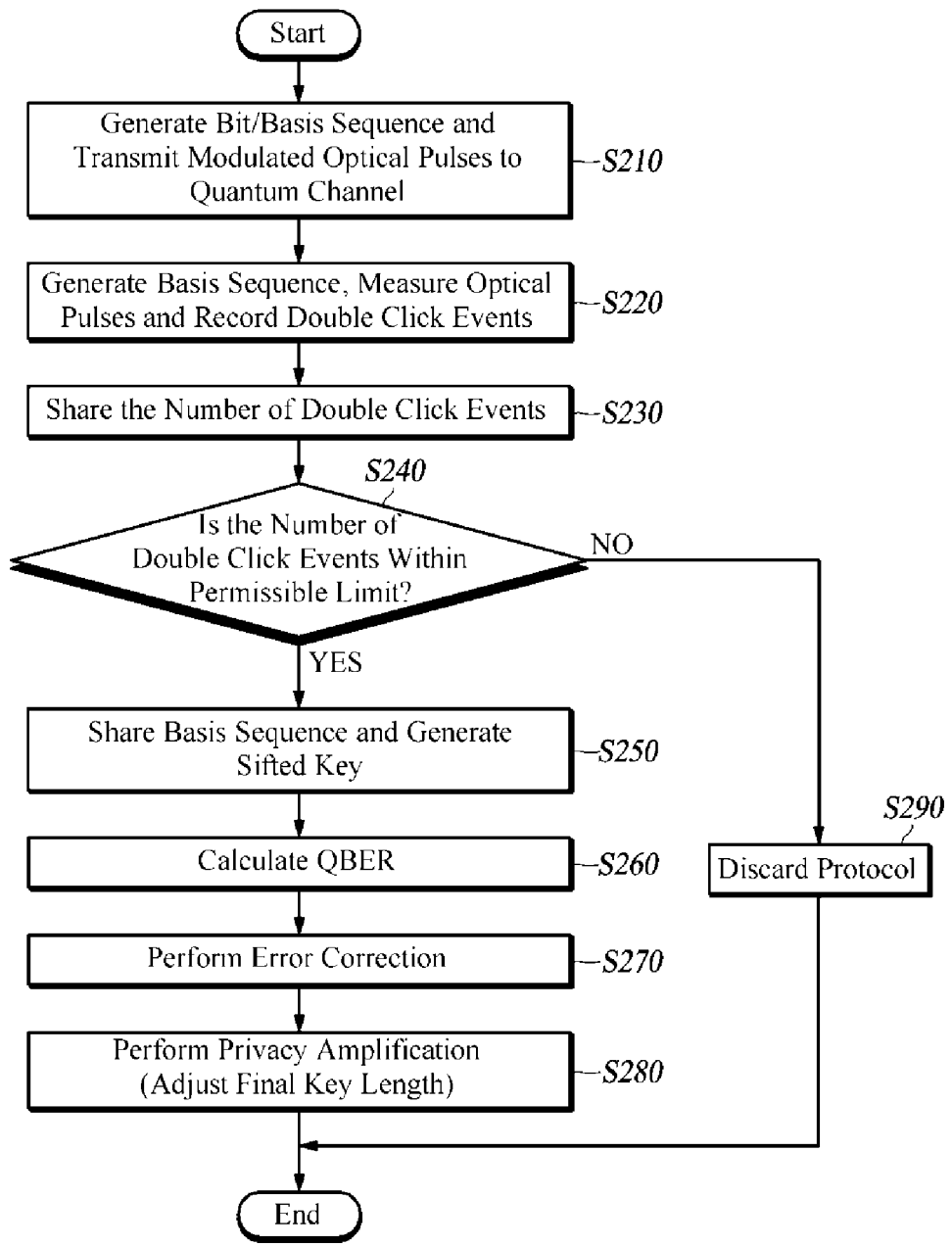
FIG. 2 is a flowchart of a method for processing double click events according to at least one embodiment of the present disclosure, which is reflected in BB84 protocol.

FIG. 2 is a flowchart of a method for processing double click events according to at least one embodiment of the present disclosure, which is reflected in the BB84 protocol.

Initially, a transmitter generates two random number sequences (i.e., bit and basis information). Then, the transmitter transmits optical pulses (quantum bits) modulated based on the random number sequences to a quantum channel (S210).

Then, a receiver randomly determines a basis sequence to be used to measure the optical pulses, and measures the optical pulses on the quantum channel by using the determined basis sequence to acquire reception data (a raw key). In addition, the number of double click events is recorded in the measurement process (S220). Particularly, when the raw key is generated, each double click event is not arbitrarily allocated a bit value of 0 or 1 but is discarded as an abnormal event.

Then, the receiver shares the number of double click events with the transmitter via a public channel (S230), and the transmitter and the receiver determine whether the number of double click events exceeds a preset permissible limit (S240). Upon determining that the number of double click events exceeds the preset permissible limit ("NO" in S240), the corresponding protocol is stopped and the corresponding raw key is discarded (S290). Upon determining that the number of double click events is within the preset permissible limit ("YES" in S240), the transmitter and the receiver exchange and share the basis sequences used thereby, and generate a sifted key by selecting only bits of the raw key, which have a common basis value (S250).

Subsequently, the transmitter and the receiver calculate a QBER by opening a part of the sifted key to each other and thus check whether an attacker eavesdrops (S260). If the QBER exceeds an appropriate level to suspect an eavesdropping, the protocol is stopped with the corresponding sifted key discarded. If the QBER does not exceed the appropriate level, normality is determined and the remainder of the sifted key after undergoing the calculation of the QBER is used as a shared key.

Then, a post-processing protocol to be performed includes an error correction process (S270) for correcting and removing bit errors generated due to incompleteness of the quantum channel and a transmission and reception system, based on the shared key, and a privacy amplification process (S280) for removing information leaked in the quantum communication process and information leaked in the error correction process. Particularly, the length of the final key is adjusted by reflecting the number of double click events in the privacy amplification process.

As described above, a method for processing double click events according to at least one embodiment of the present disclosure is implemented by simply modifying a protocol in software without a modification in hardware. Accordingly, the method for processing double click events according to at least one embodiment of the present disclosure can also be implemented as computerreadable code on a non-transitory computer readable recording medium. The non-transitory computerreadable recording medium is any data storage device that can store data which can be thereafter read by a computer system. Examples of the non-transitory computer readable recording medium include magnetic storage media (e.g., a magnetic tape, a floppy disk, a hard disk, etc.), optical recording media (e.g., a compact disk read only memory (CD-ROM) and a digital video disk (DVD), etc.)), magneto-optical media (e.g., a floptical disk, and hardware devices that are specially configured to store and execute program instructions, such as a ROM, a random access memory (RAM), a flash memory, etc.).

Contrary to a known quantum key distribution (QKD) system requiring an additional hardware such as a true random number generator (TRNG) to process double click events, various embodiments of the present disclosure detect and neutralize attacks of an attacker merely by counting the number of double click events without using a TRNG. Particularly, various embodiments of the present disclosure provide a large implementation advantage considering that the TRNG causes much burden to a QKD system in terms of cost and volume. In addition, according to various embodiments of the present disclosure, attacks of an attacker using double click events are detected and neutralized by simply modifying a protocol, and the protocol according to various embodiments of the present disclosure is easily modified in the software.

Although exemplary embodiments of the present disclosure have been described for illustrative purposes, those who have ordinary skill in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. A method performed by a processor of a receiver of generating a secret key using a quantum communication, the processor to execute the method comprising:
   performing a quantum key distribution (QKD) protocol to generate a sifted key;
   performing a post-processing protocol based on the sifted key to generate a final key;
   counting number of double click events when quantum signals are detected; and
   performing privacy amplification of the final key based on the counted number of the double click events, wherein the performing of privacy amplification comprises
- calculating an amount of information open to an attacker, based on the counted number of the double click events, and
- adjusting a length of the final key based on the calculated amount of information.

2. The method of claim 1, wherein the length of the final key is adjusted by $Length_{final} = Length_{sifted} \times \{1 - 2 \cdot h(QBER)\} - Num_{double}$, where $Length_{sifted}$ denotes a length of the sifted key, $h(x)$ denotes Shannon entropy, QBER denotes a quantum bit error rate, and $Num_{double}$ denotes the counted number of the double click events.

3. The method of claim 1, further comprising
- discarding the QKD protocol when the counted number of the double click events exceeds a preset permissible limit.

4. The method of claim 1, wherein information about the counted number of the double click events is shared with a transmitter before the sifted key is generated by implementing the QKD protocol.

* * * * *